United States Patent [19]

Maxwell

[11] Patent Number: 5,642,789
[45] Date of Patent: Jul. 1, 1997

[54] CAM ADJUSTABLE CLIMBING TREE STAND

[76] Inventor: James Clifford Maxwell, 2560 Coles Bend Rd., Smiths Grove, Ky. 42171

[21] Appl. No.: 583,305

[22] Filed: Jan. 5, 1996

[51] Int. Cl.[6] .................................................. A01M 31/02
[52] U.S. Cl. ..................................... 182/135; 182/187
[58] Field of Search .................................. 182/133–136, 182/187, 188

[56] References Cited

U.S. PATENT DOCUMENTS

| | | | |
|---|---|---|---|
| 4,137,995 | 2/1979 | Fonte | 182/187 |
| 4,726,447 | 2/1988 | Gibson | 182/135 |
| 4,989,766 | 2/1991 | Lewallyn et al. | 224/155 |
| 5,052,516 | 10/1991 | Jamieson | 182/135 |
| 5,090,504 | 2/1992 | Amacker | 182/134 |
| 5,265,780 | 11/1993 | Matthews et al. | 224/155 |
| 5,379,861 | 1/1995 | Amacker | 182/187 |

*Primary Examiner*—Alvin C. Chin-Shue
*Attorney, Agent, or Firm*—Rick Martin

[57] ABSTRACT

A tree climbing stand is made of two assemblies, the seat assembly and the platform assembly. Each has folding support arms which support a V-bar gripper. The V-bar gripper is made of hollow aluminum to maximize strength and reduce weight. Each V-bar gripper has a pair of clutch mechanisms in a housing assembly. The clutch mechanisms use cams to precisely adjust the grip on the tree and do it silently. The housing assemblies also serve to lock the entire unit together in a backpack mode.

20 Claims, 13 Drawing Sheets

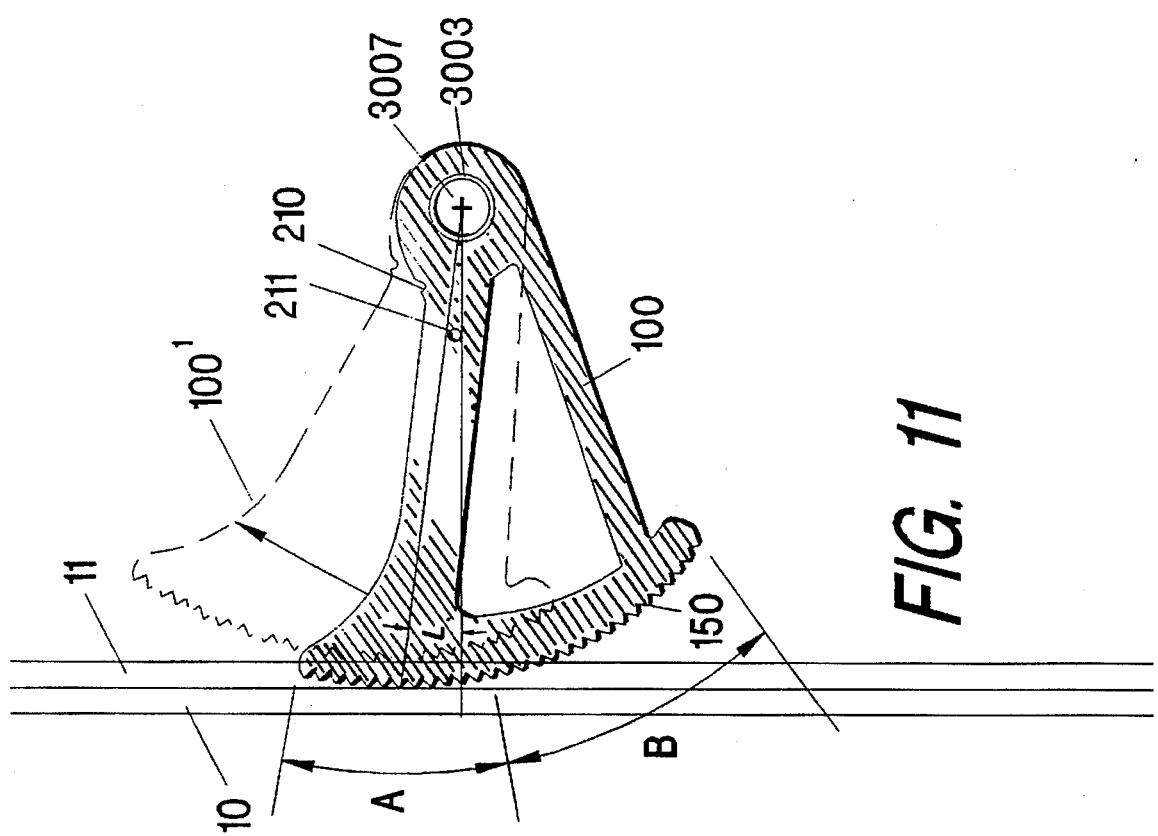

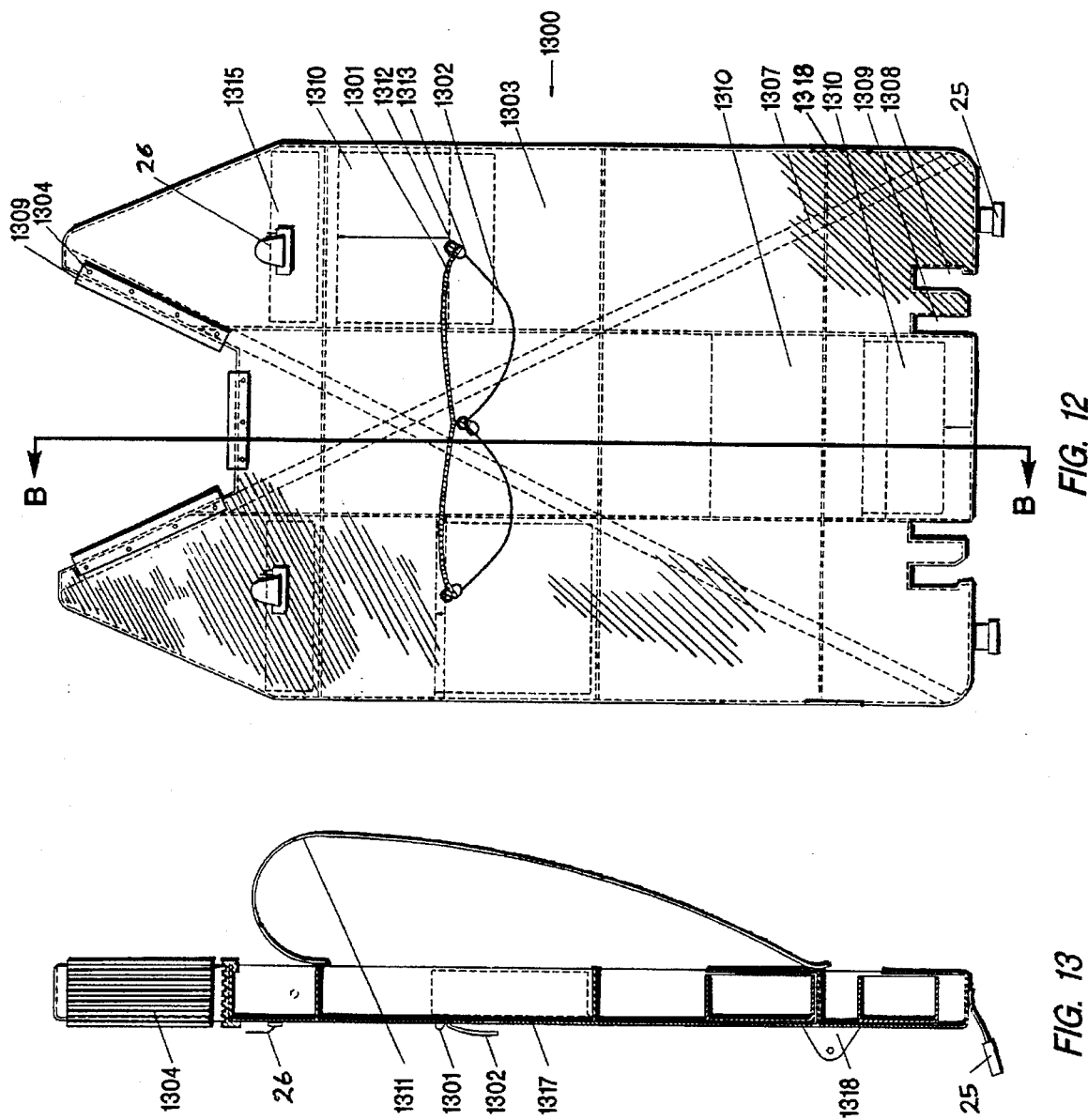

CAM ADJUSTABLE CLIMBING TREE STAND

FIELD OF INVENTION

The present invention relates to a climbing tree stand having a cam adjustable double V-bar construction. The platform and seat assemblies fold into a backpack mode, and a cam housing holds the backpack together.

BACKGROUND OF THE INVENTION

Hunters and wildlife photographers are using combination tree climbing, tree stand, and backpack assemblies. Representative of the art is U.S. Pat. No. 5,265,780 (1993) to Matthews, et al. Matthews, et al. teaches a combined backpack frame and object climbing wildlife stand having a plurality of utilization modes including a backpack mode, an object climbing mode and a wildlife stand mode comprising a first arrangement to provide a backpack frame in the backpack mode, a climbing device in the climbing mode, and a platform in the stand mode; a second arrangement detachably connected to the first arrangement to encircle the object to assist the first arrangement in climbing when in the climbing mode and to stabilize the first arrangement in the stand mode; a third arrangement detachably connected to one end of the first arrangement at approximately a right angle thereto to provide a load bearing member when in the backpack mode and to be detached from the first arrangement to provide a climbing assist member when in the climbing mode and to provide a seat for a user in the stand mode after climbing to a desired height on the object; and a fourth arrangement detachably connected to the third arrangement to encircle the object to assist the third arrangement in climbing when in the climbing mode and to stabilize the third arrangement in the stand mode; the second and fourth arrangements being stored in the first arrangement when in the backpack mode.

The platform and seat assemblies are each attached to the tree with flexible bands having a pin and springs. This type of construction tends to slip on a tree. Another disadvantage is the potential for noise while ascending and adjusting two bands. The device requires the user to stand up and support himself by his arms. This effort requires considerable arm strength. No means to readily level the device for tapering trees is taught.

The closest known prior art is the "Contender" offered by Loc-On Company, Inc., Greensboro, N.C. This device also uses support arms on a platform and seat assembly and a pair of V-bar tree grips. However, the support arms are a telescoping design with approximately two-inch incremental stops. No cam is used. Also, no cam assembly is used to join the seat and platform assemblies together into a backpack configuration. Also, the V-bars are inefficient for support purposes in that they have weaknesses in the welds, and the centroid of the moment is outside the mass of the V-bar which can allow them to deflect. This has forced the addition of cross bracing, thus making a folding design impossible.

The present invention uses a single-piece bent tubular construction for the V-bar. This design increases strength offering more torque resistance by virtue of having the centroid within the sectional area of the V-bar, and increases safety by eliminating welds which can fatigue and break over time, and eliminates the need for cross bracing. The V-bar for this invention is consequently able to be made lighter for its structural capacity. The overall design increases strength, is lighter, reduces the possibility of creaking noises, and is easier and quieter to attach to trees.

For climbing purposes the V-bar grips are silently slipped over the support arms of the platform and the seat using the "L"-shaped guides at each end of the V-bar grippers. This design allows this to be accomplished in the dark without having to remove gloves. Climbing is accomplished from the sitting position if desired. A leveling means is taught. Once climbing is accomplished, the user can either sit or stand inside guard rails. After use, the platform and seat assemblies fold into a backpack configuration.

Another known prior art is the "Shooter" offered by Summit Industries, Inc., Decatur, Ala. This device also uses support arms on a platform and seat assembly and a pair of V-bar tree grips. However, the support arms are fixed and welded with approximately two-inch incremental stops. No cam is used. Also no cam assembly is used to join the seat and platform assemblies together into a backpack configuration. Also the V-bars are inefficient for support purposes in that they have three welded segments as opposed to the present invention's bent tubular construction with ribs. Finally the Shooter's frames are multi-piece in construction and are welded steel for support. The present invention uses a single-piece frame construction for each of the seat and platform assembly. This design increases the strength, reduces the creaking noises, and folds flat for a backpack configuration.

The present invention avoids the use of any loose or dangling bands. For climbing purposes the V-bar grips are silently slipped over extension arms of the platform and the seat using the "L"-shaped guides which allow this to be done in the dark with gloves on. Climbing is accomplished in the sitting position if desired. A leveling means is taught. Once climbing is accomplished, the user can either sit or stand inside guard rails. After use, the platform and seat assemblies fold into a backpack configuration.

SUMMARY OF THE INVENTION

The main object of the present invention is to provide a streamlined multi-purpose tree climber that is silent in operation by the use of a cam adjustable V-bar gripper.

Another object of the present invention is to provide a means to climb from the sitting position.

Another object of the present invention is to provide a simple folding means having a housing on the V-bars to join the segments together into a backpack.

Another object of the present invention is to provide the apparatus with a leveling means.

Another object of the present invention is to provide a means of attaching the V-bar gripper without having to illuminate the parts in the dark or without having to remove gloves in order to be able to feel the parts to be assembled.

Another object of the present invention is to provide a lighter yet stronger V-bar than in prior art.

Other objects of this invention will appear from the following description and appended claims, reference being made to the accompanying drawings forming a part of this specification wherein like reference characters designate corresponding parts in the several views.

The cam adjustable climbing tree stand consists of separate platform and seat assemblies that can inchworm their way up a tree in the sitting position in a known manner. It is the precise design of the components which sets the present invention apart as a new, useful, and non-obvious improvement to the prior art. The seat and platform assemblies are each equipped with a pair of support arms supported by folding and locking hinges. In the active position, a V-bar gripper having a cam assembly at each end is silently slid over the support arms. The cams provide a precisely adjustable grip against the tree. The cam assembly also has a housing. This housing serves the dual function of housing the cam as well as joining the support arms of the seat and platform assemblies together in the backpack mode.

When the climber encounters a tapering tree-trunk segment, he can pull a pair of cords which operate the cam release levers and the forward slide action of the "V" assembly. Then he can adjust the level of the platform by holding the platform attached to his feet at the desired degree of level and drawing the "V" down the support arms; or to retract the "V", the platform arm end is lowered so that gravity assists with the "V" sliding away from the back of the tree while the cords are first pulled rotating the cams away from the support arms and the engagement position while mild pressure between the tree and "V" is applied.

The frames of the platform assembly are of a uni-structure design, and the seat is a "U" shape with a bonded front contact piece. Thus, no creaking of parts occur which would create noise. Also, this design allows both assemblies to lie flat against one another in the backpack position. A carry bag is hung from its top and clipped at the bottom to the folded assembly to provide a true backpack capability.

BRIEF DESCRIPTION OF THE DRAWINGS

FIG. 11 is a top plan view of the cam isolated from its assembly and interfacing with the support arms.

FIG. 12 is a top plan view of an alternate embodiment of the platform assembly.

FIG. 13 is a sectional view of the preferred embodiment of the platform assembly cut along lines B—B of FIG. 12.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
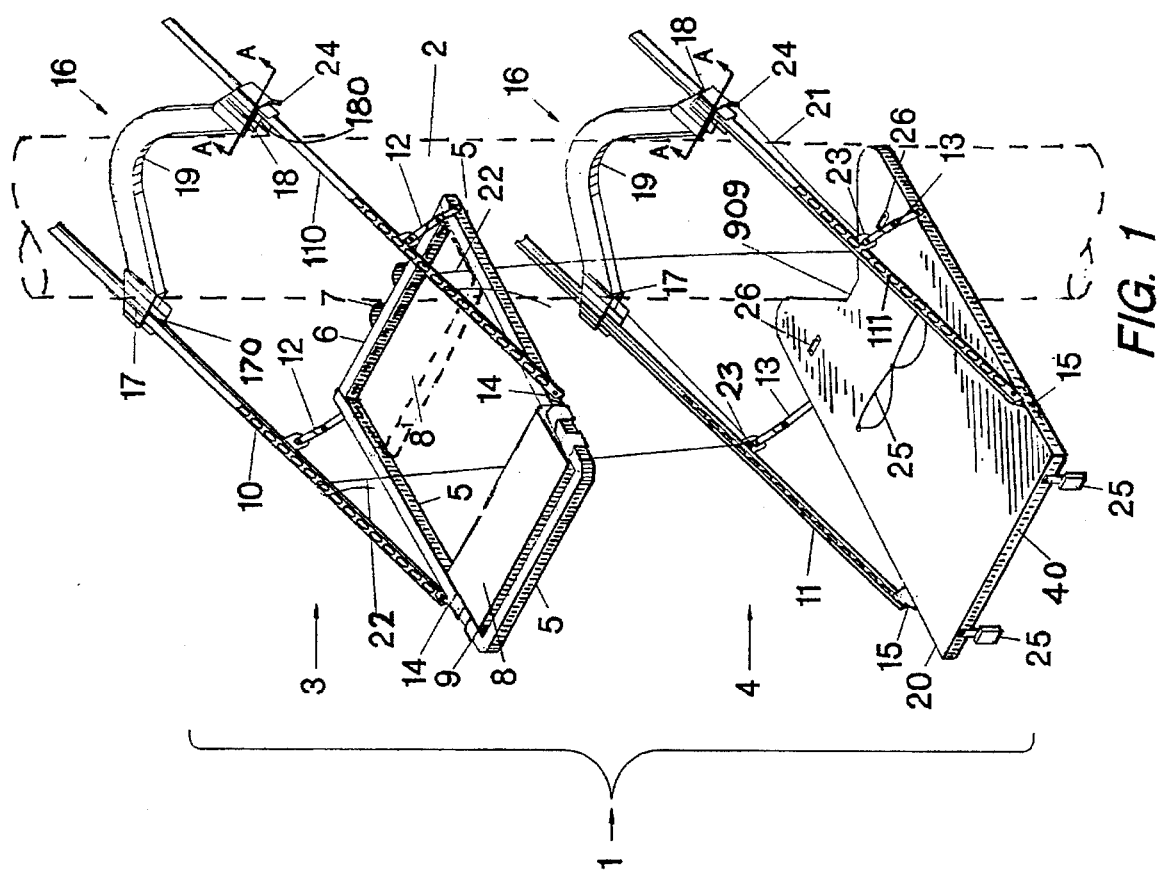
FIG. 1 is a top perspective view of the preferred embodiment.

Referring first to FIG. 1 the tree stand 1 consists of a seat assembly 3 and a platform assembly 4. The tree stand 1 has three modes of operation. They are first a backpack mode, second a climbing mode, and third a stand mode. FIG. 1 depicts the stand mode as the tree stand 1 is supported by tree 2.

The seat assembly 3 consists of a U-shaped frame member 5 preferably made of aluminum tubing. This frame member 5 also acts as a guard rail while the user is standing. The frame member 6 takes a significant portion of the weight load against the tree 2. It is preferably made of carbon/glass pulltrusion. A tree contacter 7 centers the seat assembly 3 on the tree 2. It is preferably made of carbon/glass and epoxy resin vertical uprights with an elastomeric covering on the actual contacting areas. The seat 8 is fastened to the seat frame member 5 with webbing 9 and quick-release buckles below the seat (not shown). The seat 8 can be moved to the position shown in dots as $8^1$ for sitting facing away from the tree 2.

The support arms 10, 110 and 11, 111 pivot at points 14 on the U-shaped frame member 5, and at points 15 on the platform assembly 4. They are further supported by folding hinges 12 on the seat member 3 and 13 on the platform member 4. V-bar 16 is tubular and curved having a ribbed elastomeric inner surface 19. It is preferably made of E.P.D.M. rubber with some natural latex added. The clutch assemblies 17, 18 releasably secure the V-bar 16 to the support arms 10, 110 and 11, 111.

The platform assembly 4 consists of a unibody platform 20. It is preferably made of carbon/glass and resins with molded reinforcing ribs. The assembly 16, with parts 17, 18, 19, is identical to the like assembly on the seat assembly. Cords 21, 22 are used to release the cams 100 in the clutch assemblies 17, 18 in order to level the platform assembly 4 and to draw the V-bar assembly in toward the notch 909 of the platform 4 thereby gripping the tree 2. Eyelets 23 are attached to the support arms 11, 111 to guide the cords 21, 22. Levers 24 release the cams in the clutch assemblies 17, 18. Foot stirrups 25 are used to secure the climber's feet to the platform 4 while in the climbing mode and to assist in positioning the platform for leveling. Clips 25 and hooks 26 are used to secure a backpack as seen in FIG. 2

The combination of the clutch assemblies 17, 18 and the guides 170, 180 in the ends of the clutch assemblies 17, 18 allow the climber to attach his tree stand to the tree in the dark, without a flashlight and without the necessity of removing gloves. There are no knobs to twist nor pins to lose as in prior art. The present invention is a fast, quiet, fool-proof attachment and climbing system that will also allow the climber to make leveling adjustments to the tree in infinitely small increments, unlike the inch-and-a-half to two-inch increments of prior art. The present invention also allows the climber to start his climb from a level position, unlike prior art, and finish level with a system which is safer, quieter, and faster than prior art.

Figure 2:
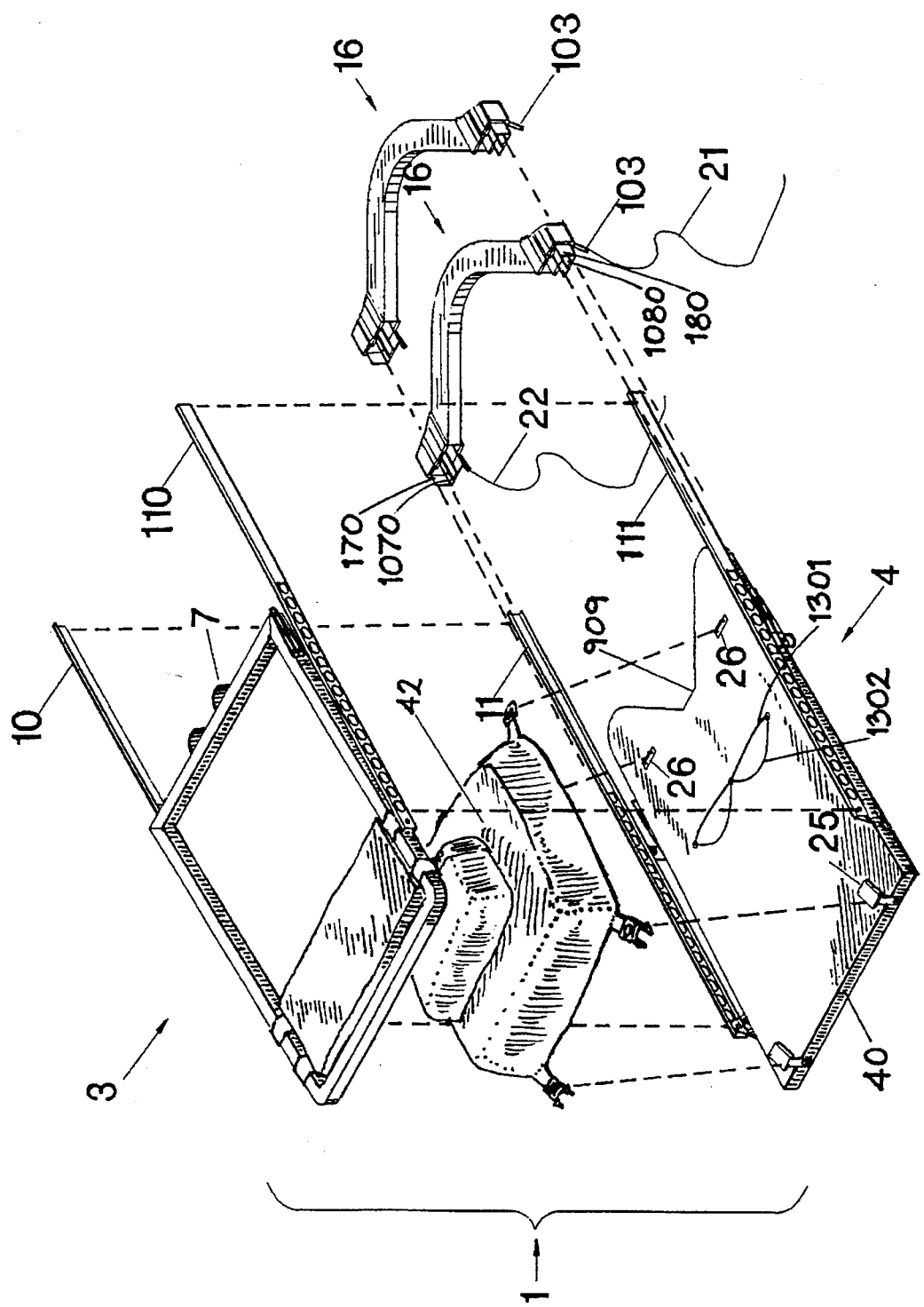
FIG. 2 is a top perspective exploded view of the preferred embodiment in the backpack mode.

Referring next to FIG. 2 the tree stand 1 is seen folded flat in preparation for conversion into the backpack mode. This operation would normally take place on the ground after the tree stand is no longer needed. It could very well be dark. Note how the clips 25 are rotated up. The V-bars 16 are guided over both sets of supports arms 10, 110 and 11, 111. This is done after flipping the seat assembly 3 and placing it atop the platform assembly 4. To complete the conversion to the backpack mode, the backpack 42 is hung from clips 26 and clipped to clips 25 as shown. This entire procedure and the reverse procedure can be done in the dark and with gloves on due to the ease of feeling the ends of the support arms 10, 110 and 11, 111 as they are inserted in the guides 170, 180 of the cam housings 17, 18 and the guiding track 1070, 1080 of the clutch assembly which forces proper alignment.

Figure 3:
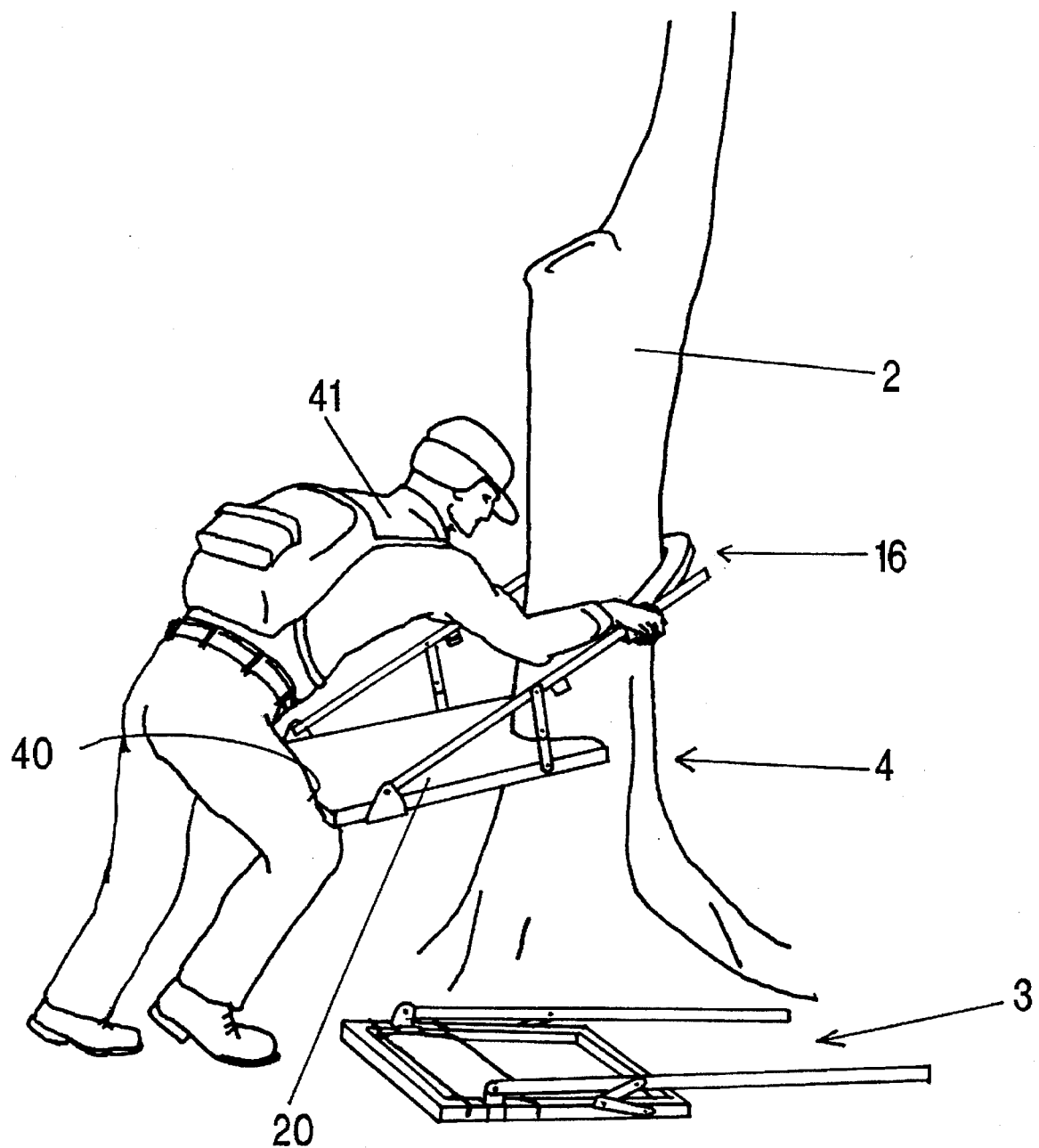
FIG. 3 is a side perspective view of the preferred embodiment being used to initiate the climb.

FIG. 3 depicts the climber 41 with the tree stand 1 in disassembled mode beginning to place the stand on the chosen tree 2. He rests the leading edge 40 of the platform 20 against his upper leg to hold it in position while guiding the V-bar assembly 16 into position by feeling the ends of the support arm pairs 11 or 111 as they enter the L-shape of the guides 170, 180 in the clutch assemblies 17, 18. As the V-bar 16 is about to slide over the support arms 11, 111 the climber 41 squeezes the levers 103 with his hands to rotate the cams 100 away from the support arms 10, 11 into position 100' (see FIG. 10) so that it will silently fit over the support arms 11, 111. The seat assembly 3 is shown at the base of the tree 2.

Figure 4:
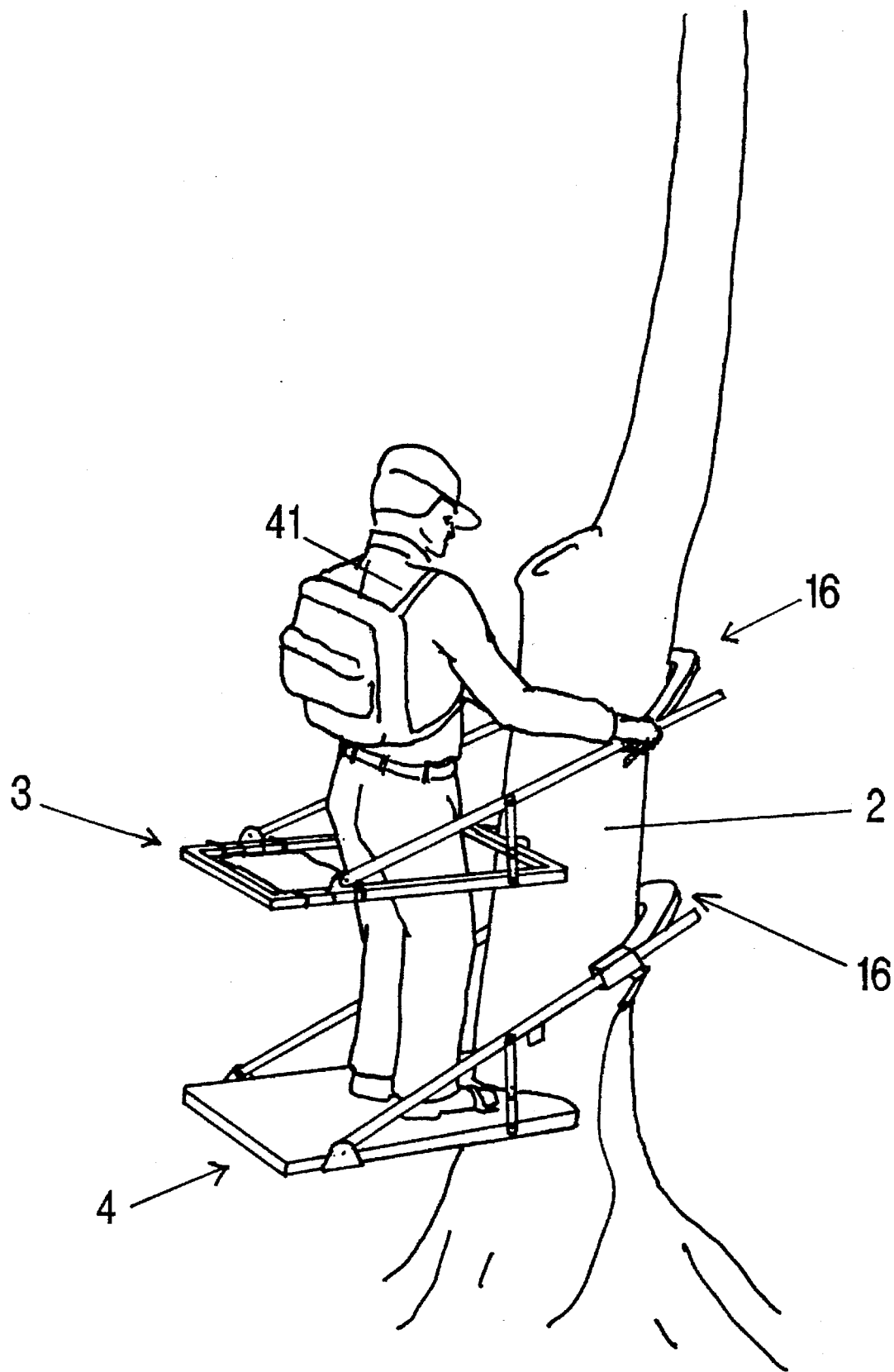
FIG. 4 is a side perspective view of the preferred embodiment and the climber affixing the V-bar member to the tree to begin the climbing mode.

FIG. 4 shows the climber 41 attaching the second V-bar 16 around the tree 2 to the seat assembly 3.

Figures 5, 5A:
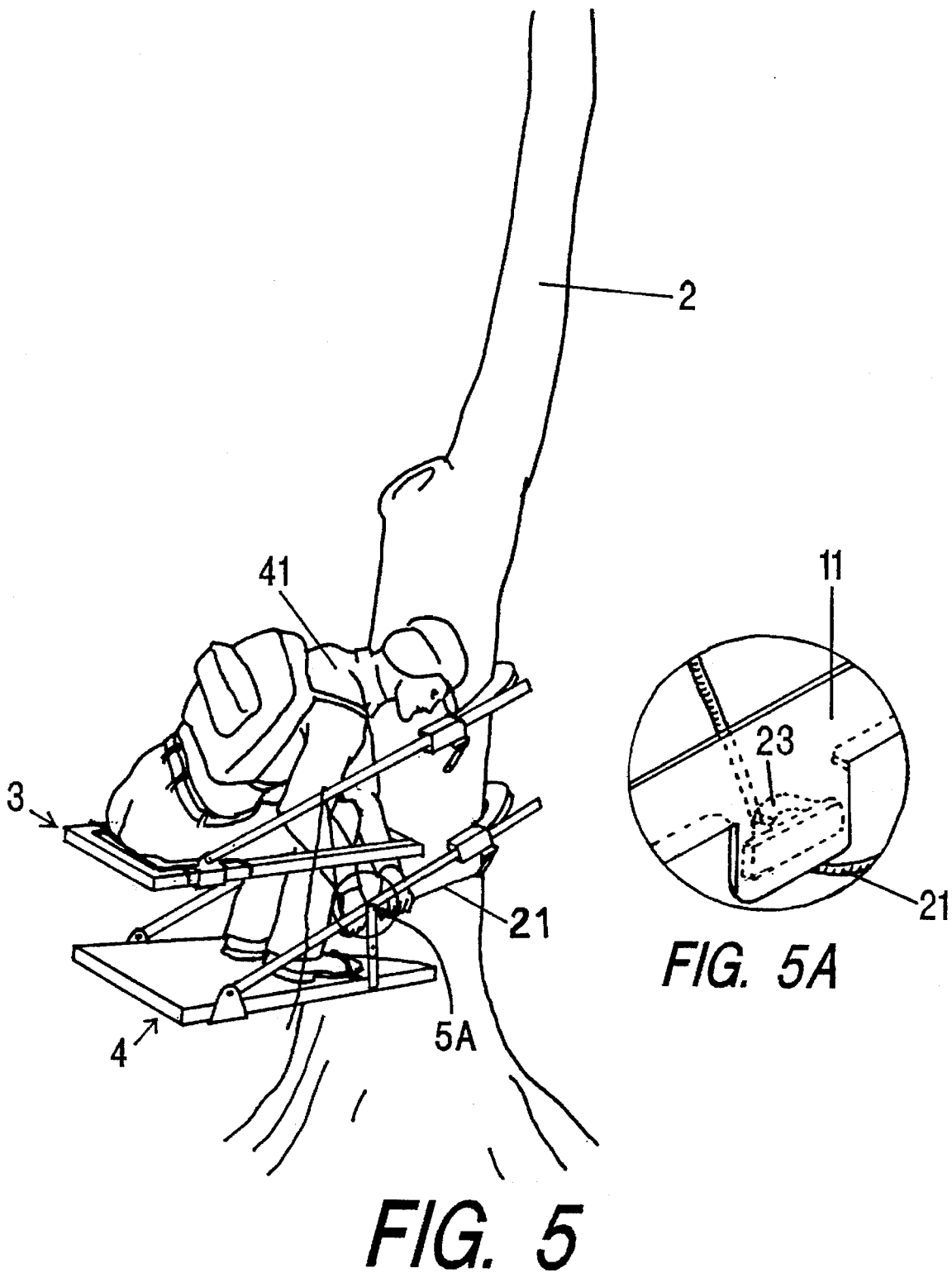
FIG. 5 is the same view as FIG. 4 with the climber affixing the leveling cords.
FIG. 5A is a close up of circle 5A of FIG. 5.

FIG. 5 shows the climber 41 with the seat assembly 3 lower so that he can easily reach the foot stirrups 1301, 1302 which affix his feet to the platform 4. He then inserts the cords 21, 22 through the eyelets 23 as shown in FIG. 5A.

Figure 6:
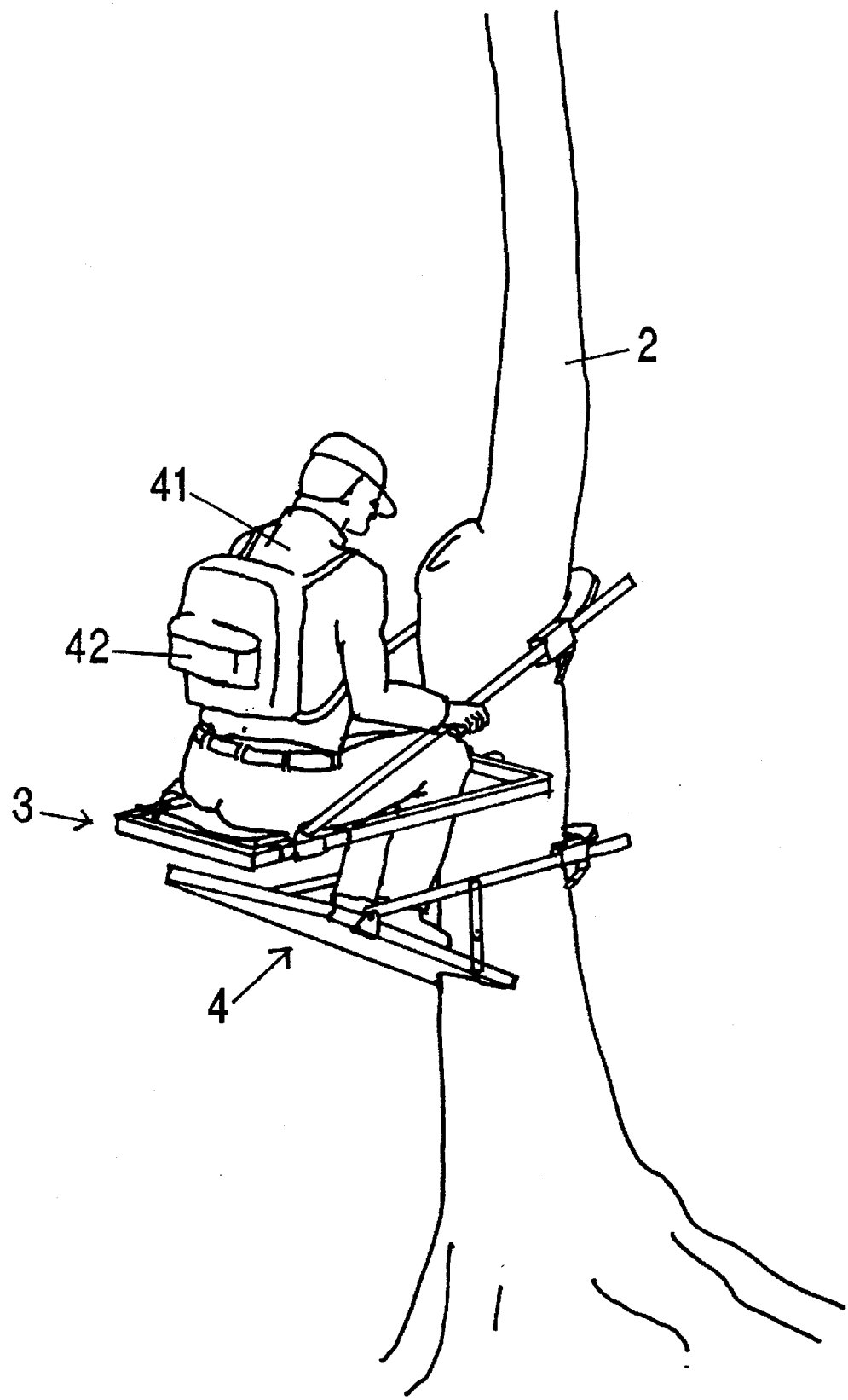
FIG. 6 is the same view as FIG. 5 with the climber climbing.

FIG. 6 shows the climber 41 at the middle position of the first move as he is seated and raising his feet and platform 4 to a comfortable raised position. He will then rotate the platform 4 to the position where the inside rubber gripper surface of the V-bar 19 rests against the back surface of the tree 2. This inchworm process is repeated until the climber 41 has gained the desired height.

Figure 7:
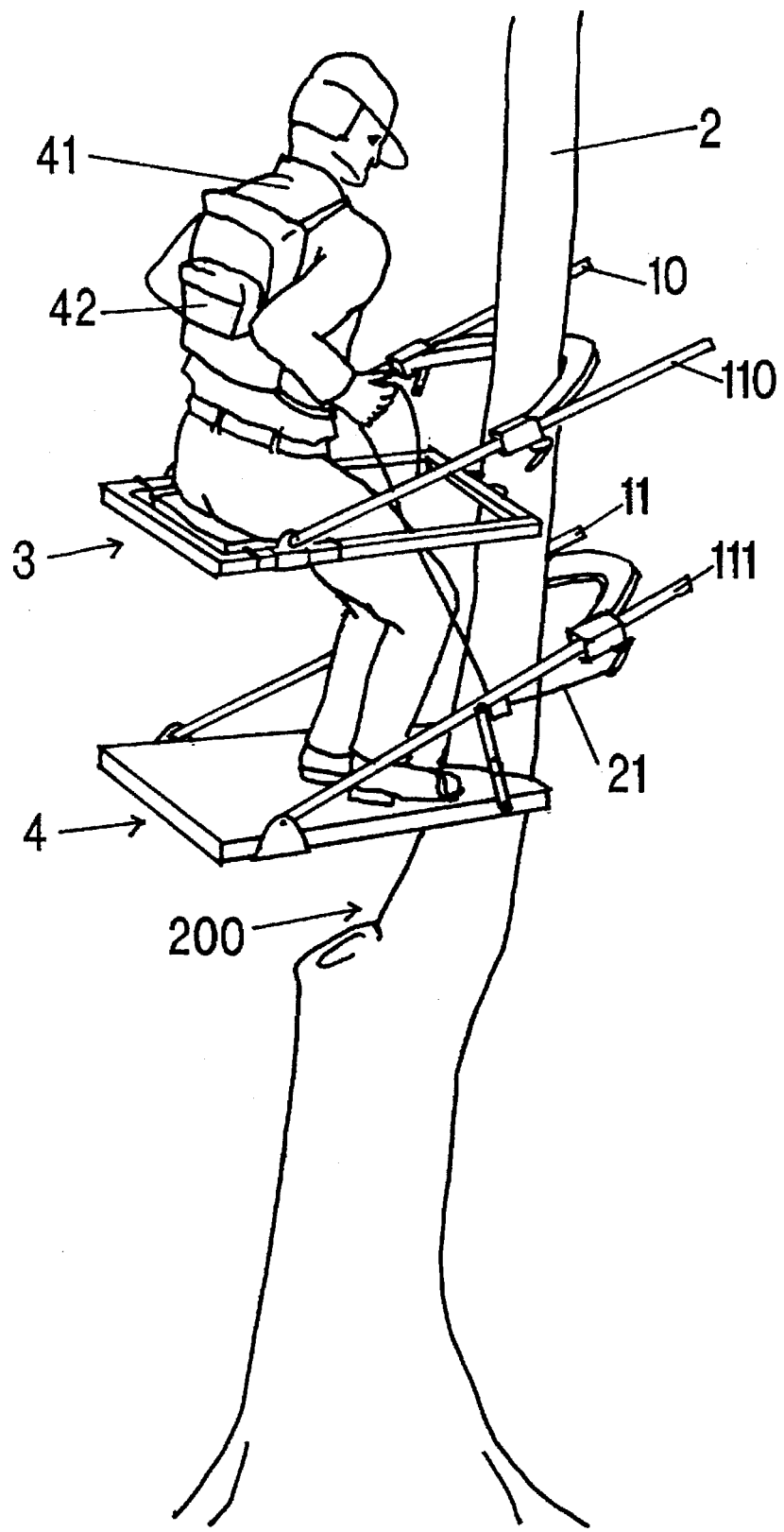
FIG. 7 is the same view as FIG. 6 with the climber leveling the platform.

As the climber 41 is climbing and he encounters the tree taper 200, FIG. 7 shows him adjusting the V-bar position to attain a level attitude. This is accomplished by pulling the cords 21, 22 whose ends are permanently attached to the levers 103. Very little force is required to bring the V-bar 16 downward and into the back of the tree 2. Once the climber 41 is at the desired height, he can change the seat position to 8° so that his back is against the tree if desired, which is typical for bowhunters (see FIG. 1). The backpack 42 will be removed from his back and either hung from an arm of the stand, from a limb, or from a screw hook the climber might have brought along. The rifle or bow (not shown) will then be raised by means of a string he would have earlier attached in a safe manner so that the rifle barrel will not be pointing upwards.

Figure 8:
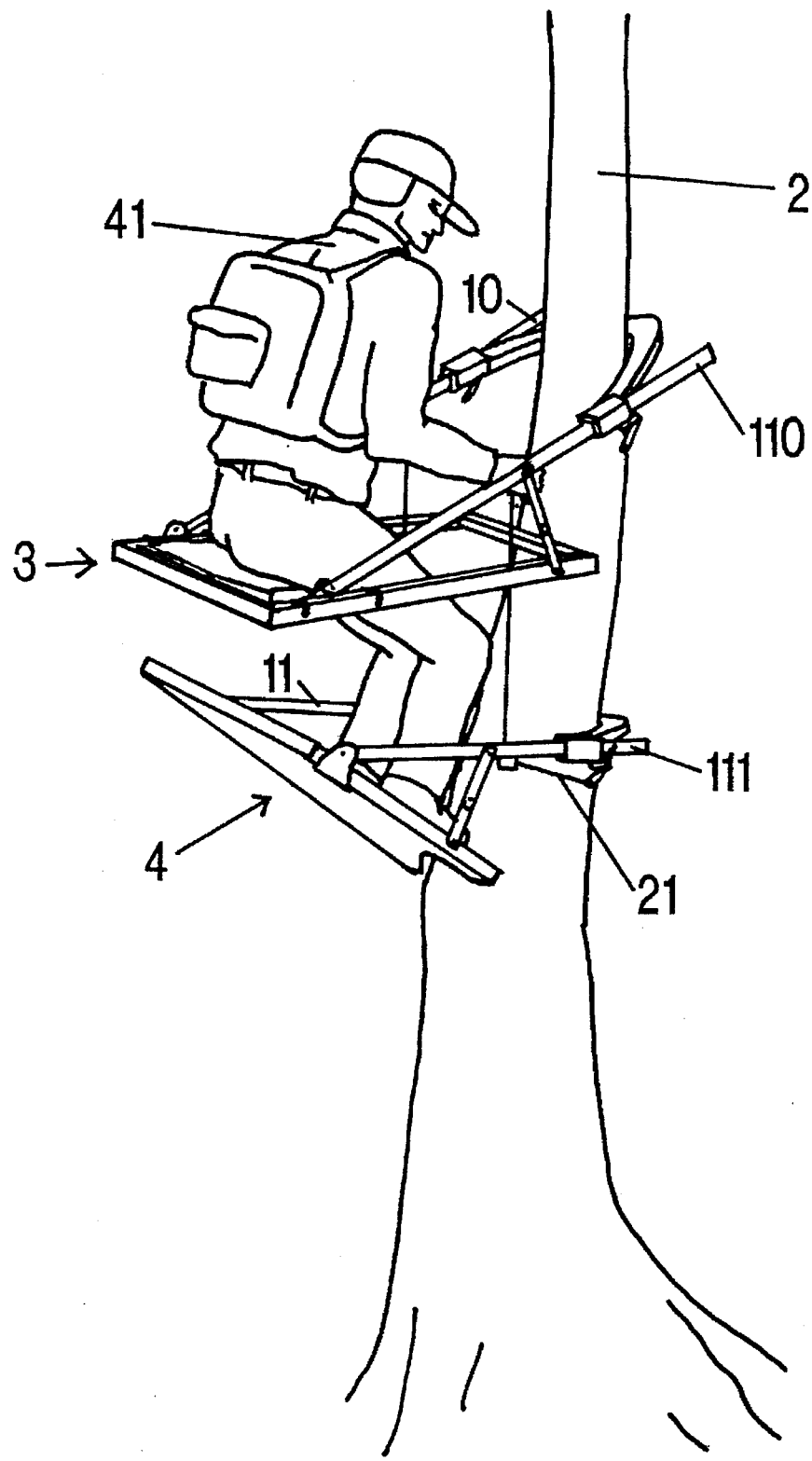
FIG. 8 is the same view as FIG. 7 with the climber descending.

FIG. 8 depicts the day complete and the climber 41 and tree stand 1 safely descending the tree 2. This is accomplished by the design of the levers 103 and cords 21, 22. Descent is performed with the aid of gravity by the climber 41 lowering the platform 4 attached with the stirrups 1301, 1302 to his feet so that the support arms 11, 111 are level or less than level. The climber 41 then draws his feet toward his body so that pressure is placed between the back of the tree 2 and the inside surface of the V-bar assembly 19. He simultaneously pulls both cords 21, 22 which rotates both cams 100 away from their engagement position with the supporting arms 11 to position 100'. (See FIG. 9). Once the cams 100 are released, the climber 41 continues to draw the platform assembly 4 towards himself with his feet until the V-bar assembly 16 is at a more remote position creating a wider aperture in the total platform assembly 4. He will then hold the platform assembly 4 in the level or near level position and pull on the cords 21, 22 drawing the V-bar assembly 16 down until it contacts the back of the tree 2. Because the coil springs 152 (see FIGS. 9, 10) maintain constant contact, unless intervened on by the climber 41, between the cam 100 and the support arms 11, 111 the climber 41 is in no danger of falling due to this maneuver. The low attack angle of the cam 100 of 7° or slightly less ensures a good and secure attachment of the V-bar assembly 16 to the steel arms 10, 110 and 11, 111 without creating a binding grip which would be difficult and noisy to disengage.

Figure 9:
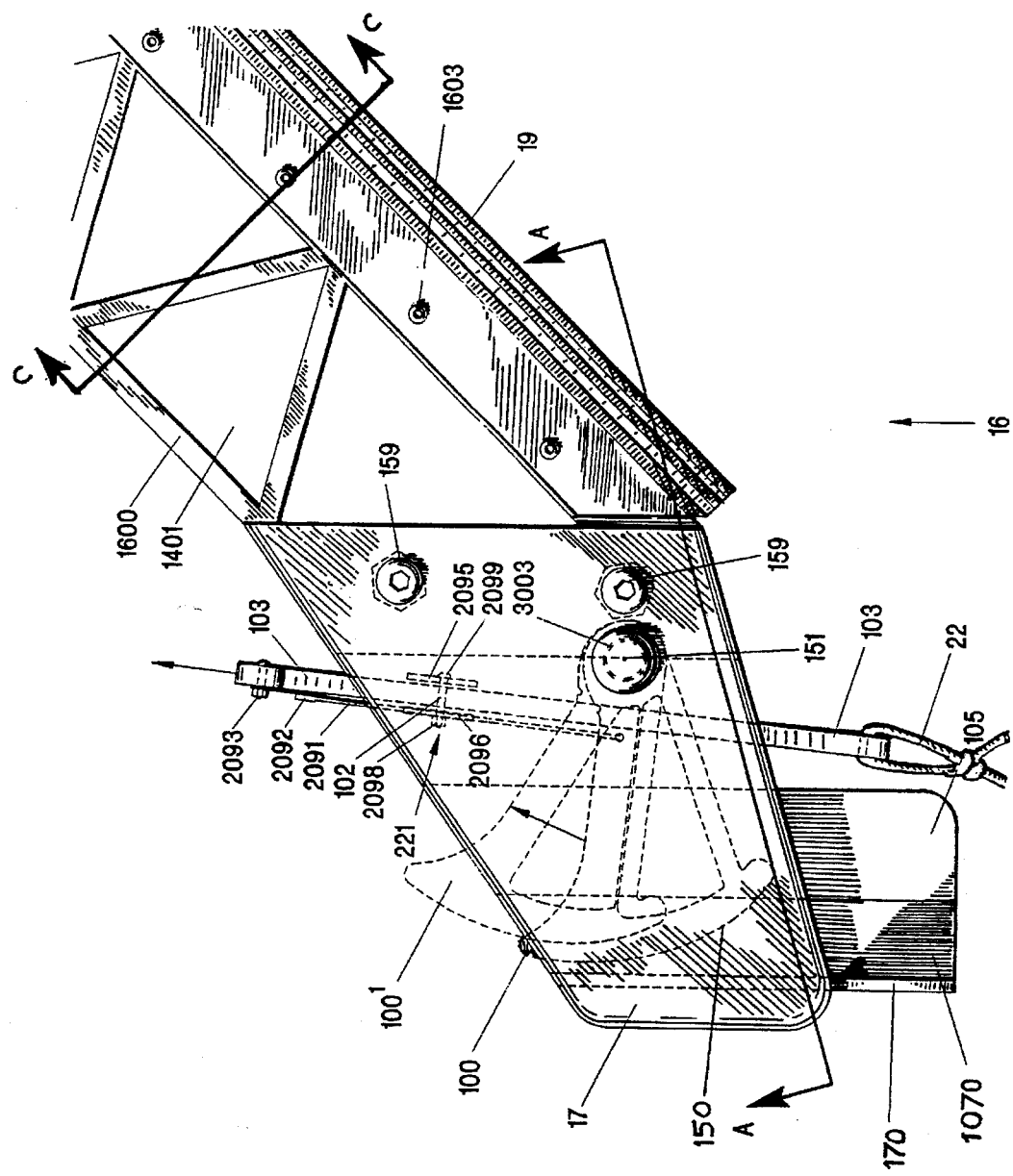
FIG. 9 is a top plan view with a cutaway showing the clutch assembly and cam assembly.
Figure 10:
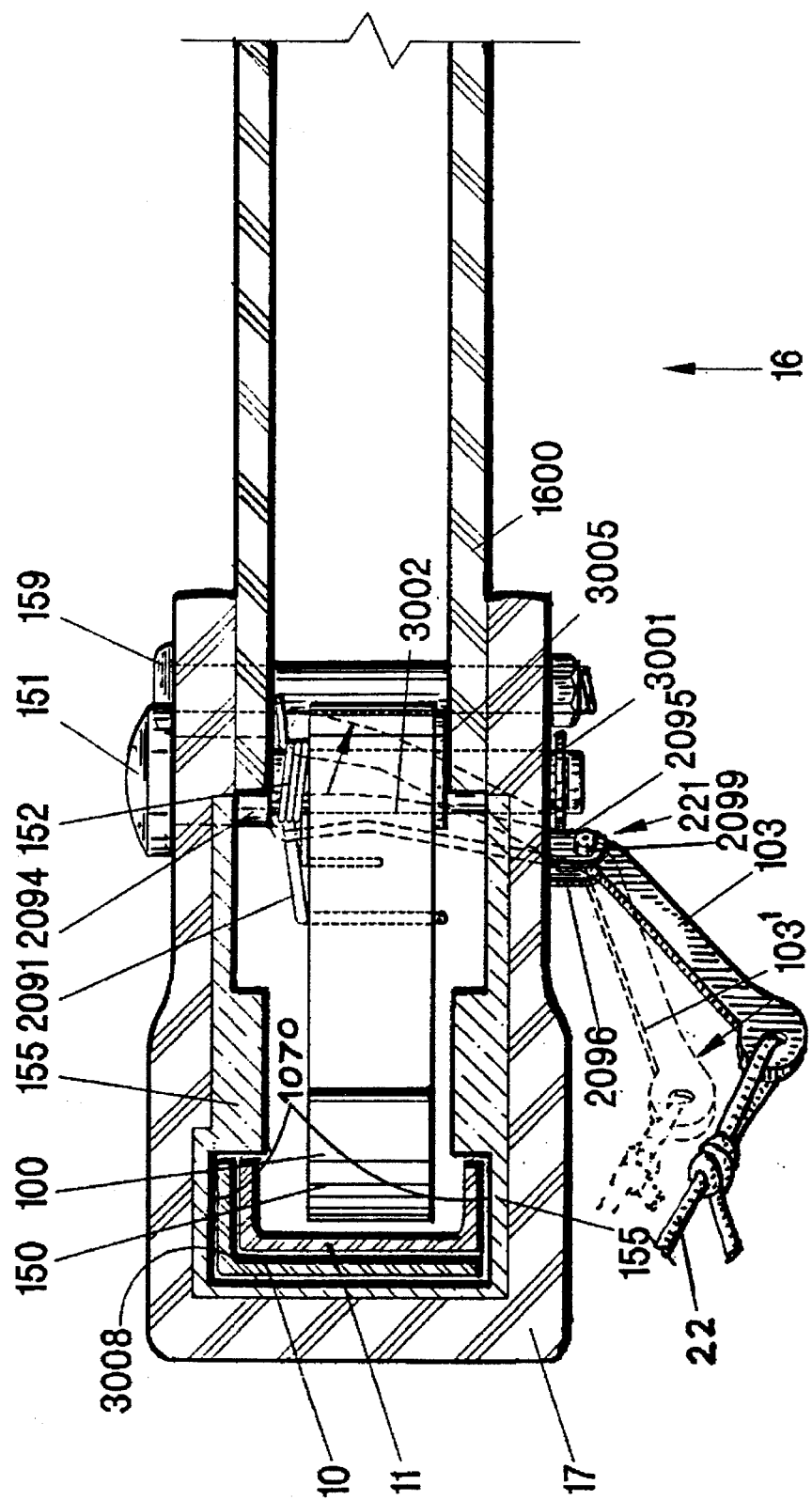
FIG. 10 is a sectional view of the cam assembly taken along lines A—A of FIGS. 1, 9.

Referring next to FIGS. 9, 10 the clutch assembly 17 is seen in the preferred embodiment to further comprise a cam 100 made of a tempered steel alloy with a cast bearing surface 150 comprising a series of ridges which create greater pressure against the objects they contact. Cams 100 controllably lock onto the inner surface of support arms 10, 10 and/or 11, 111. Cam 100 is shown rotating to the released position at 100. A release lever 103 pivoting around an axis 221 comprising a lightweight bolt 2099 and nut 2098 passing through two bent tabs 2095, 2095 secured to the bottom of the cam housings 17, 18 by two small screws each, is actuated by cords 21, 22 when held in the lowered position with pressure between the V-bar 16 and the tree 2, or when pressure from a climber's hands is applied directly to the levers 103. Force is transferred from the lever 103 to the cam 100 by a wire 2091 rotationally attached with double right-angle bends through hole 211 in cam 100 and secured at the opposite end by a swedged fitting 2092 through bolted to the lever 103 with a lightweight bolt and nut 2093. A heat-hardened steel axle 151 serves as a center or rotation for the cam 100. The axle has a larger diameter closure segment 2094 which is designed to hold the coil spring 152 in place between the top of the cam 100 and the inner surface of the V-bar tube 1600 end. The axle 151 also has a large head which secures its top end. A smaller diameter segment 3002 supports the cam 100. A roto-clip 3001 secures the axle 151 in place. A thin nylon bushing 3003 maintains free movement between the cam 100 and the axle 151.

Coil spring 152 puts pressure between its end leg on one of the bolts 159 and the notch 210 (see FIG. 11) on cam 100. This creates a force directed toward the inside surface of the nylon guide 155 and the steel support arms 10, 110 and 11, 111. Bolt 159 binds the tubular V-bar 1600 to the cam housing 17, 18. This constant pressure creates a normally engaged situation and is consequently a safety factor for the climber 41. The bottom surface of cam 100 rests on a nylon washer 3005 creating a reduced frictional base for its rotation. The rotational hole 3007 of cam 100 has a nylon bushing 3003 fitting snugly inside it providing additional friction reduction without the wall of the bushing being so thick as to let the engagement angle of the cam increase to a dangerous angle as the bushing 3003 wears.

The nylon guide 155 has a guide slot 3007 in it to force the support arms 10, 11 to the bearing side 3008 should they be bent through rough usage. This maintains the correct engagement angle between the cam 100 and the support arms 10, 110. The cams 100 have double radii (see FIG. 11, items A, B) which allow the cams 100 to engage either one pair of support arms 10 and 110 or 11, 111 (depending on whether addressing the seat portion 3 or the platform portion 4 respectively) or both pairs of support arms 10, 110 and 11, 111 when they are nested together as seen in FIGS. 2 and 11. The advantage of this is it allows the climber 41 to pick up the entire assembly 1 by one or both of the V-bar assemblies 16 to move it or to position it in the backpack mode.

Referring next to FIG. 10 pressure from the climber's hands and/or the force exerted on cords 21, 22 rotate lever 103 to position 103' which is rotatably connected to axle 221 comprising a lightweight bolt 2099 and nut 2098 set between two tabs 2095 and 2096 affixed to the bottom of clutch housings 17, 18 by screws. The distal end of lever 103 has another lightweight bolt and nut assembly 2093 passing through a hole in that end and rotatably connected to a swedge device 2092. (See FIG. 9). The swedged ended of said swedge device 2092 compressively fastens to one end of a wire 2091 and the opposite sides of hole 211 passing through cam 100. The upwards rotation of lever 103 by the climber's hand causes the cam 100 to rotate to position 100'. This position 100' is free and clear of contact with the thicknesses of support arms 10, 110 and/or 11, 111 (one thickness and/or two respectively) allowing the V-bar assembly 16 to be drawn away from the back of the tree by the method described earlier. Upon release of pressure from the lever 103 or the cords 21, 22, cams 100 are rotated by coil spring 152 back into their engagement position with support arms 10, 110 and/or 11, 111 producing a safety factor for the climber 41 while in active climbing mode.

Still referring to FIG. 10 is seen nylon guide 155 with its guide track 1070 (see also FIG. 9) which forces the support arms 10, 110 and/or 11, 111 to the inside surface 3008 where they are in correct position for engagement by cams 100. Also seen is the hardened steel axle 151 which has three diameters below its connecting head. The largest diameter cylinder area 2094 prevents the coil spring 152 from dislodging from its correct position, the second diameter is the axle section of axle 151 passing through cam 100 and its thin nylon bushing 3003. Cam 100 is seen to rest on a nylon washer 3005 to help maintain free movement. As axle 151 penetrates clutch housing 17, 18 it is secured into position by a roto-clip 3001 locking into the third and smallest diameter section of axle 151. "L"-shaped support arm 10 is seen in the nested position over the "C"-shaped support arm 11 with the gripping surface 150 of cam 100 rotatingly contacting the inside surface of support arm 11.

Referring to FIG. 11 cam 100 has a double radius curvature (A, B) to enable locking on either a single support arm 10 or 110 for climbing. The "L"-shaped support arm 110 is shown nested over the "C"-shaped support arm 11 and cam 100 is shown in the locked position 100' against the double thickness of the two support arms 110, 11 as is normal for the backpack mode. Angle L is nominally 7.29°. Position of cam 100 at 100' shows the cam 100 locked to the two support arms. The radii of quadrants A and B are nominally 1.756" and 1.350" respectively.

Referring next to FIGS. 12 and 13 the preferred embodiment of platform 20 is shown as platform 1300. It is a molded grid construction having hollows 1303 from the bottom and diagonal reinforcing ribs 1307. Elastomeric mats with ribs 1304 help grip the tree and are secured to the composite platform 1300 by blind compression rivets 1309. Hooks 26 support the upper portion of the backpack (not shown) and clips 25 secure the bottom of said backpack. Notch 1308 supports the limb of a bow and notch 1309 allows the passage of the bowstring. Drawers 1310 open toward the tree 2. Foot stirrups 1301 and 1302 secure the climber's feet and are attached to the composite platform by passing through one side of wire figure eights 1313 with flat-head machine screws 1312 passing through the other side of the loop into imbedded "T" nuts in the composite platform. Straps 1311 are adjustable backpack straps likewise attached to the bottom side of the ribs of the composite platform 1300. Clip in rechargeable battery packs 1315 are there for the electric socks or gloves of the climber. Diagonal reinforcing 1307 provides torque resistance to the climber standing off center at one corner.

Figure 14:
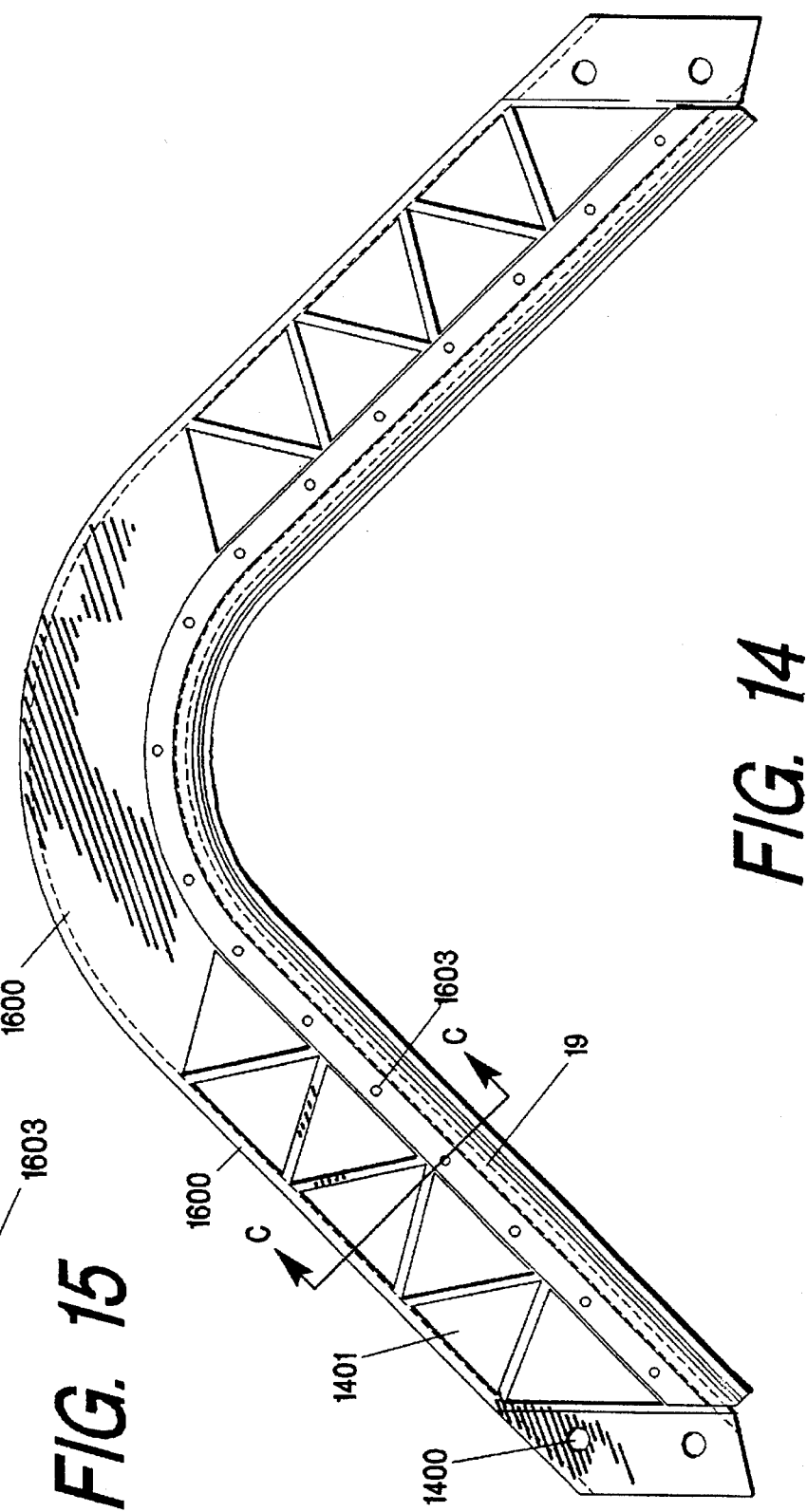
FIG. 14 is a top plan view of the preferred embodiment of the V-bar less the clutch housings.
Figure 15:
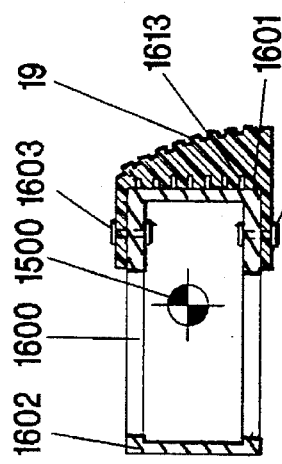
FIG. 15 is a sectional detail of FIG. 14 cut along lines C—C of FIG. 14.

Referring to FIGS. 14 and 15 the preferred embodiment of the tubular V-bar is shown. This embodiment is an extrusional shape which is annealed, bent in a radius, retempered, and stamped to reduce weight. The clutch housings 17, 18 are then attached by bolts 159 through holes 1400. The V-bar tube 1600 for the present invention is unlike prior art in that it is three-dimensional and has the centroid 1500 within its mass. This offers more torque resistance and a more synergistic design than V-bars for prior art. Consequently, it is possible to reduce the weight of bent tube 1600 with a series of castellated holes 1401 on the top and bottom surfaces of the tube 1600 producing a tree-gripping V-bar which is lighter, stronger, and eliminates the need for cross reinforcing on the platform as in prior art. The front and back surfaces 1601, 1602 are left unpenetrated as they bear the majority of the tension and compression. A ribbed length of gripping surface 19 (preferably E.P.D.M.) is secured to the aluminum tube 1600 with a series of blind compression rivets 1603 top and bottom. The ribs of the rubber gripping surface 19 aid in gripping the tree 2 and are designed at a slight cant as seen in FIG. 15 to gain more surface contact with the tree 2 when in the climbing mode. The unseen inside of the rubber gripping surface 19 has slots 1613 which serve to aid in weight reduction. Note that unlike prior art there are no welds to fatigue and weaken over time in the aluminum tube 1600, and that there are no sharp edges on the gripping surface 19 to damage tree bark and allow insect and microbial infestation.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A combined backpack frame and climbing wildlife stand enabling a user to employ said combination to climb a selected one of a tree and a pole, said combination having a plurality of utilization modes including a backpack mode, a climbing mode, and a wildlife stand mode, said combination comprising:

a platform assembly means to provide a backpack frame in said backpack mode, a climbing device in said climbing mode, and a platform in said stand mode;

a seat assembly means detachably connected to said platform assembly means to encircle said selected one of a tree and a pole with a V-bar gripper means attached to a pair of support arms which are attached to said seat assembly means to assist said platform assembly means in climbing said selected one of a tree and a pole when in said climbing mode and to provide a seat and a safety rail in said stand mode;

said platform assembly means having a V-bar gripper means attached to a pair of support arms which are attached to said platform assembly means to encircle said selected one of a tree and a pole to assist said seat assembly means in climbing;

said V-bar gripper means having a V-shaped bar to grip the tree and a housing assembly at each end of the V-bar gripper;

said housing assemblies each further comprising a clutch assembly and a track to releasably engage said support arm; and said track further comprising a locking means functioning to releasably engage a support arm of said seat assembly means and said support arm of said platform assembly means when said platform assembly means is in said backpack mode.

2. The combination of claim 1, wherein said support arms of said seat assembly means and said support arms of said platform assembly means nest together in a nested mode in a folded position in the backpack mode.

3. The combination of claim 1, wherein the seat assembly means further comprises a U-shaped frame member having a tree contacter.

4. The combination of claim 3, wherein the seat assembly means further comprises a movable seat that can be moved to allow sitting towards or away from the tree, or removed to allow standing.

5. The combination of claim 3, wherein the platform assembly means further comprises a unibody platform having a notch facing the tree.

6. The combination of claim 2, wherein said housing assemblies each further comprise guides to enable the user to engage the support arms in the nested mode as well as a support arm in the climbing mode.

7. The combination of claim 1, wherein the clutch assembly further comprises a cam having a dual radius functioning to lock on a single support arm in the climbing mode and lock on a pair of nested support arms in the backpack mode.

8. The combination of claim 7, wherein the clutch assembly further comprises a release lever having a mechanical means to enable the user to release the cam.

9. The combination of claim 8, wherein the release lever further comprises a cord to enable the user to release the cam and level the third platform means.

10. The combination of claim 1, wherein the platform assembly means further comprises shoulder straps and hooks for securing a backpack.

11. The combination of claim 1, wherein said platform assembly means further comprises a stirrup to engage on the user's feet in the climbing mode.

12. The combination of claim 1, wherein said V-bar gripper further comprises a hollow geometrical form with the center of gravity being inside the hollow.

13. A combined backpack frame and climbing wildlife stand enabling a user to employ said combination to climb a selected one of a tree and a pole, said combination having a plurality of utilization modes including a backpack mode, a climbing mode, and a wildlife stand mode, said combination comprising:

a platform assembly means to provide a backpack frame in said backpack mode, a climbing device in said climbing mode, and a platform in said stand mode;

a seat assembly means detachably connected to said platform assembly means to encircle said selected one of a tree and a pole with a V-bar gripper means attached to a pair of support arms which are attached to said seat assembly means to assist said platform assembly means in climbing said selected one of a tree and a pole when in said climbing mode and to provide a seat and a safety rail in said stand mode;

said platform assembly means having a V-bar gripper means attached to a pair of support arms which are attached to said platform assembly means to encircle said selected one of a tree and a pole to assist said seat assembly means in climbing;

said V-bar gripper means having a V-shaped bar to grip the tree and a housing assembly at each end of the V-bar gripper;

said housing assemblies each further comprising a clutch assembly and a track to releasably engage said support arm; and said V-shaped bar further comprising a hollow geometrical form with the center of gravity being inside the hollow.

14. A combined backpack frame and climbing wildlife stand enabling a user to employ said combination to climb a selected one of a tree and a pole, said combination having a plurality of utilization modes including a backpack mode, a climbing mode, and a wildlife stand mode, said combination comprising:

a platform assembly means to provide a backpack frame in said backpack mode, a climbing device in said climbing mode, and a platform in said stand mode;

a seat assembly means detachably connected to said platform assembly means to encircle said selected one of a tree and a pole with a V-bar gripper means attached to a pair of support arms which are attached to said seat assembly means to assist said platform assembly means in climbing said selected one of a tree and a pole when in said climbing mode and to provide a seat and a safety rail in said stand mode;

said platform assembly means having a V-bar gripper means attached to a pair of support arms which are attached to said platform assembly means to encircle said selected one of a tree and a pole to assist said seat assembly means in climbing;

said V-bar gripper means having a V-shaped bar to grip the tree and a housing assembly at each end of the V-bar gripper;

said housing assemblies each further comprising a clutch assembly and a track to releasably engage said support arm; and said clutch assembly further comprising a cam.

15. The combination of claim 14, wherein the platform further comprises a carbon/glass composite construction having hollows.

16. The combination of claim 14, wherein the seat assembly means further comprises a U-shaped frame member having a tree contacter.

17. The combination of claim 14, wherein the seat assembly means further comprises a movable seat that can be moved to allow sitting towards or away from the tree, or removed to allow standing.

18. The combination of claim 14, wherein said track further comprises an aperture cooperating with said cam to releasably engage said support arm of said seat assembly means and said support arm of said platform assembly means when said platform assembly means is in said backpack mode.

19. The combination of claim 18, wherein said clutch assembly further comprises a release cord to enable leveling of the platform assembly means.

20. The combination of claim 18, wherein said support arms of said seat assembly means and said support arms of said platform assembly means nest together in a nested mode in a folded position in the backpack mode.

* * * * *